United States Patent
Yoshii

[15] 3,668,894
[45] June 13, 1972

[54] SLIP-CLUTCH

[72] Inventor: Tetsuji Yoshii, Neyagawa, Japan

[73] Assignee: Matsushita Electric Industrial Co., Ltd., Osaka, Japan

[22] Filed: Sept. 14, 1970

[21] Appl. No.: 71,682

[30] Foreign Application Priority Data

Sept. 19, 1969 Japan..................................44/76029
Oct. 2, 1969 Japan..................................44/78822

[52] U.S. Cl. ...........................................................64/30 R
[51] Int. Cl..............................................................F16d 7/02
[58] Field of Search .........................................64/30 R, 30 C

[56] References Cited

UNITED STATES PATENTS 911,534  2/1909  Alford........................................64/30
2,050,613  8/1936  Kellogg..................................64/30 C

*Primary Examiner*—Allan D. Herrmann
*Attorney*—Stevens, Davis, Miller & Mosher

[57] ABSTRACT

A slip-clutch having frictionally driving and driven rotable members. The driving members are supported by springs so that, when the coefficient of friction between the driving and driven members is varied, the driving members are radially shifted or displaced to have varied radius of the circle along which the driving members are moved whereby the variation in the radius compensates for the variation in the coefficient of friction to thereby transmit a regulated and constant torque.

7 Claims, 8 Drawing Figures

PATENTED JUN 13 1972  3,668,894

T. YOSHII
INVENTOR

BY *Stevens, Davis, Miller & Mosher*
ATTORNEYS

SLIP-CLUTCH

BACKGROUND OF THE INVENTION

1. Field of the Invention

The present invention relates to a slip-clutch for transmitting a constant torque. The kind of clutch is suited generally, but not restrictively, for use with a tape winding-up mechanism of a tape recording and reproducing apparatus.

A conventional torque transmission clutch of this kind which is of simple construction is one in which a pair of driving and driven rotatable members, one of which has a layer of friction material secured thereto, are disposed in opposite relationship with the friction layer interposed therebetween and are resiliently biased toward each other. The clutch is designed to have a relative rotational sliding movement between the friction layer and the other of said rotatable members so as to transmit a constant torque. The torque transmitted by this kind of clutch is mathematically given by:

$$M = \mu \times P \times R \qquad 1.$$

wherein $M$ is the torque transmitted by the clutch, $\mu$ is the coefficient of friction between the sliding surfaces of the driving and driven members, $P$ is the pressure force acting perpendicularly on the sliding surfaces, and $R$ is the effective radius of the sliding surfaces.

The coefficient of friction $\mu$ is varied during the operation of the clutch for a long time, with a result that the torque $M$ transmitted by the clutch is also varied correspondingly. The variation in the torque given by the clutch gives rise to various troubles in operation. For example, when the torque transmitted is increased due to increase in the coefficient of friction, the tape to be wound-up is subjected to an excessive amount of tension which would cause a permanent strain in the tape. On the other hand, when the torque is decreased, the tape advanced by a capstan is subjected to insufficient take-up torque and becomes slackened and accumulated between the capstan and a take-up reel. The slackening and accumulation of the tape cause it to become rumpled and/or to wind itself around the pinch rollers, causing a breakage of the tape. In order to eliminate these difficulties, various attempts have been made to obtain a slip-clutch having coefficient of friction characteristic which would be stable and constant throughout the operation of the clutch. However, to date such a slip-clutch which is satisfactory to the intended purpose has not been realized.

It is, therefore, a principle object of the present invention to eliminate the difficulties above-stated.

It is another object of the present invention to provide a slip-clutch which can transmit a regulated and constant torque during operation over prolonged periods of time even if the coefficient of friction between at least one of the sliding surfaces of the driving and driven members should be varied during such operation.

It is a further object of the present invention to provide a slip-clutch in which the variation in the coefficient of friction between the cooperating frictionally driving and driven members is automatically compensated with the variation in the radii of the frictionally driving members to transmit a constant and regulated torque.

It is a still further object of the present invention to provide a slip-clutch in which the variation in the coefficient of friction concerned is automatically compensated with a combination of the variation in the radii of the frictionally driving members and the variation in the pressure force which urges the driving and driven members into mutual frictionally pressure contact for thereby transmitting a constant or regulated amount of torque therebetween.

SUMMARY OF THE INVENTION

According to one aspect of the invention, there is provided a slip-clutch comprising frictionally driving and driven members, and means for resiliently supporting said driving members in such a manner that when the coefficient of friction between the driving and driven members is varied, the radius of the circle along which the driving members are moved in frictionally sliding engagement with the driven member is also varied whereby the variation in the radii of the drive members compensates for the variation in the coefficient of friction to thereby transmit regulated and constant torque between the driving and driven members.

According to another aspect of the invention, there is provided a slip-clutch comprising frictionally driving and driven members, and means for resiliently supporting said driving members in such a manner that when the coefficient of friction between the driving and driven members is varied, the radius of the circle along which the driving members are moved in frictionally sliding engagement with the driven member is also varried, said driven member having its friction surface inclined in a radial direction, said inclined friction surface causing a variation in the pressure force acting perpendicularly on the sliding surfaces of said driving and driven members when the radii of said driving members are varried, whereby the variation in said radii of said driving members and the variation in said pressure force serve to compensate for the variation in said coefficient of friction so that a regulated and constant torque is transmitted.

Other objects and features of the present invention will become apparent from the following description of preferred embodiments of the present invention with reference to the accompanying drawings.

DESCRIPTION OF THE DRAWINGS

FIG. 1 is an axial sectional side view of a prior art slip-clutch utilized in a tape winding-up mechanism of a tape recording and reproducing apparatus or the like;

DESCRIPTION OF A PRIOR ART

Figure 1:
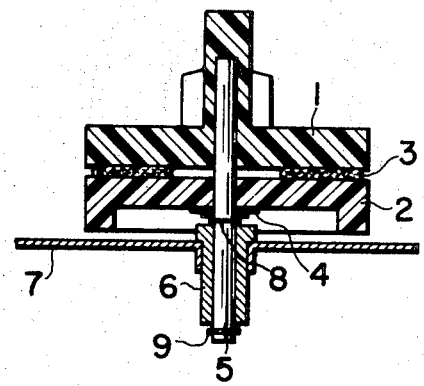

Before the preferred embodiments of the invention are described, a reference will be made to FIG. 1 and 2 which illustrate a conventional slip-clutch utilized in a tape winding-up mechanism of a tape recording and reproducing apparatus to which the present invention is generally, but not restrictively, applicable. The conventional slip clutch comprises a reel supporting and driving wheel 1 and a wheel driving pulley 2 having a layer of friction material 3 secured to the surface of the pulley 2 facing the wheel 1. The wheel 1 and the pulley 2 are mounted on a common shaft 5 for free rotation, respectively. The shaft 5 is rotatably received by a bearing 6 which in turn is supported by a base or a part 7 of the frame of the apparatus. A stop ring 8 is provided around the shaft 5 adjacent the end of the bearing 6 facing the pulley 2, the stop ring serving to retain a spring 4 in pressure contact with the other face of the pulley 2 so that the friction material 3 is resiliently urged against the opposite surface of the wheel 1 with a constand pressure force. The stop ring 8 also serves to determine and regulate the height of the reel supporting and driving wheel 1. Another stop ring 9 is provided around the bottom end of the shaft 5 so as to prevent the shaft 5 from being accidentally slipped out of the bearing 6.

As described previously, the coefficient of friction between the cooperating surfaces of the reel supporting and driving wheel 1 and the friction material 3 on the pulley 2 is varied during the operation of the clutch for long time. For this reason, the torque transmitted by the clutch is also varied correspondingly with resultant disadvantages as discussed before.

Figure 3:
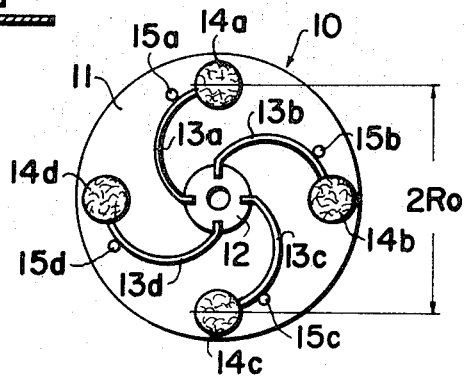
FIG. 3 is a plan view of a torque transmitting driving member and frictional sliding members of the slip-clutch according to one aspect of the present invention.
Figure 4:
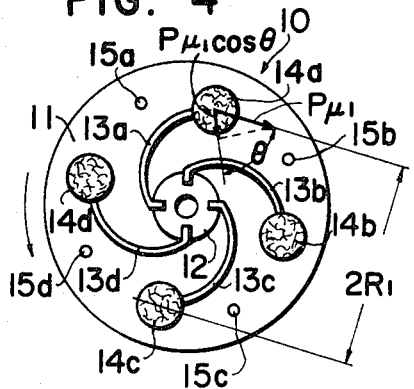
FIG. 4 is a view similar to FIG. 3 but illustrating the frictional sliding members in their different positions.

Referring to FIGS. 3 and 4 of the drawings, a slip-clutch according to one aspect of the invention is designed to eliminate the above-discussed disadvantages and comprises a reel supporting and driving wheel and a wheel driving pulley generally indicated at 10. The reel supporting and driving wheel may be identical in construction with the wheel 1 illustrated in FIG. 1 and, thus, is not shown in the drawings for the simplification of illustration.

The driving pulley 10 is driven by any appropriate torque-transmission means such as a belt and comprises a disc-like member 11 having a hub 12 located centrally thereof. A plurality of arcuate wire springs 13a to 13d are secured at their one ends to the hub 12 and extend outwardly in such a manner as to generally form an inverted swastika-like formation. Friction members 14a to 14d of felt or non-woven fabric material are rigidly mounted on the other or outer ends of the springs 13a to 13d, respectively, so as to be disposed in frictional sliding contact with the bottom surface of the reel supporting and driving wheel (not shown) in a manner similar to that in the clutch shown in FIG. 1. It will be appreciated that the springs 13a to 13d extend substantially in parallel relationship to the surface of the disc-like member 11 although this is not shown in the drawings. It will also be understood that leaf springs may be substituted for the wire springs 13a to 13d. Furthermore, the arrangement for supporting the slip-clutch of the present invention may be similar to that for the conventional disc type slip-clutch as shown in FIG. 1. Stop pins 15a to 15d are provided on the surface of the disc member 11 in such positions as to be abutted upon by respective outer ends of the springs 13a to 13d so that the friction members 14a to 14d do not move outwardly beyond the periphery of the disc member 11. The springs and friction members are designed to have their positions illustrated in FIG. 3 when the clutch is not operated.

The arcuate springs 13a to 13d are designed to be deformed, due to a variation in the friction between the set of the friction members 14a to 14d and the cooperating surface of the reel supporting and driving wheel, in such a manner that the springs tend to be wound about the hub 12 of the disc member 11. In other words, each pair of diametrically opposed friction members 14a and 14c or 14b and 14d are positioned to have a distance $2R_o$ therebetween, or $R_o$ between the axis of the disc member 11 and each friction member, when the pulley 10 is not in operation. In the initial portion of the operative life of the pulley 10, the wire springs 13a to 13d will have such position that the friction members 14a to 14d will be swivelled on a circle of a diameter which is slightly less than the dimension represented by $2R_o$. However, after the coefficient of friction is varied, the springs are so deformed that the friction members are caused to have a decreased diameter $2R_1$ of the circle on which the friction members are moved or swivelled, as shown in FIG. 4. Thus, the pulley 10 will transmit a constant torque if the radius of the circle on which the friction members are rotated is decreased in inverse proportion to the increase in the coefficient of friction between the friction members and the cooperating surface of the driven member.

More specifically, the force components acting upon one of the friction members in operation will be discussed with reference to FIG. 4 of the drawings. As an example, the friction member 14a is subjected to a friction force acting thereon in tangential direction to the circle along which the friction member is moved in frictional sliding contact with the cooperating surface of the driven member. The friction force is represented by $P \mu_1$ wherein $P$ is the pressure force acting perpendicularly on the friction member 14a and $\mu_1$ is the coefficient of friction between the friction member and the cooperating surface of the driven member. The friction force will produce a generally inwardly directed force component which is represented by $P \mu_1 \cos \theta$ wherein $\theta$ is the angle between the tangential line to the circle of sliding movement of the friction member 14a at the center thereof and the line passing through the center of the friction member radially to the curvature of the arcuate wire spring 13a. This generally inward force component will serve to generally inwardly deform or bend the wire spring 13a so that the friction member 14a becomes to be moved along a decreased circle having a reduced diameter $2R_1$ (radius $R_1$). The torque transmitted when the friction members are swivelled along this decreased circle is given by:

$$M = P \times \mu_1 \times R_1 \qquad 2.$$

Thus, by giving to the springs 13a to 13d a spring characteristic which would vary the radii of the friction members in inverse proportion to the variation in the coefficient of friction $\mu$, it is possible to obtain from the clutch of the present invention a substantially constant torque which is not varied with the variation in the coefficient of friction between the driving and driven members.

Figure 5:
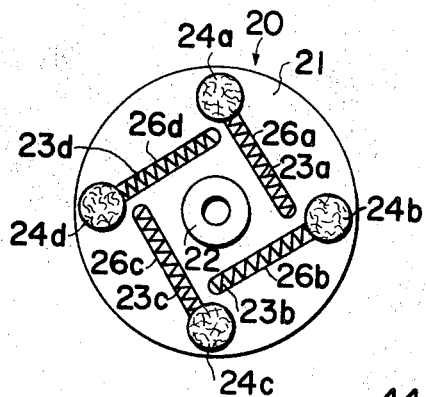
FIG. 5 is a plan view of another embodiment of the driving member of the clutch according to the present invention.

FIG. 5 illustrates a modification to the frictionally driving disc member and friction members shown in FIGS. 3 and 4. The modification comprises a torque transmitting pulley 20 comprising a disc-like member 21 having a central hub 22. Grooves 26a to 26d are formed in the surface of the member 21. Compression springs 23a to 23d are disposed in the grooves 26a to 26d, respectively, and have their one ends secured to one ends of the grooves, respectively. The other ends of the springs are rigidly connected with friction members 24a to 24d, respectively, in such a manner that the friction members are guided by and movable along respective grooves. The friction members 14a to 14d are similar to those described with reference to FIGS. 3 and 4 and, therefore, are not described herein.

Figure 6:
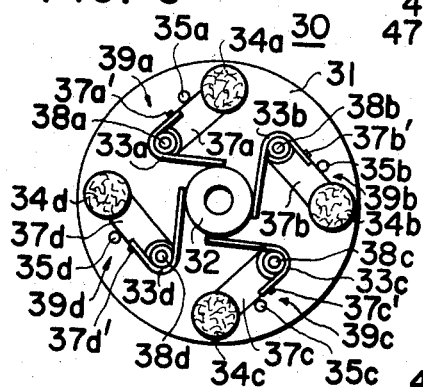
FIG. 6 is a plan view of a further embodiment of the driving member of the clutch according to the invention.

FIG. 6 illustrates another modification to the torque transmission pulley shown in FIGS. 3 and 4. The instant modification comprises a torque transmitting pulley 30 comprising a disc-like member 31 similar in construction to the disc-like member 11 shown in FIGS. 3 and 4. The pulley 30 has a plurality of generally radially inwardly movable frictionally torque transmitting units 39a to 39d mounted on the disc-like member 31. The units 39a to 39d are of identical construction and it will be sufficient to describe the arrangement of one (39a) of these units. The torque transmitting unit 39a includes an arm 37a having a friction member 34a rigidly secured to one or outer end of the arm. The arm 37a is pivotally connected at its other or inner end to a pin 38a rigidly mounted on the disc-like member 31 approximately at intermediate point of the radius passing through the pin. A generally V-shaped spring 33a rotatably mounted on the pin 38a. The spring has its inner leg in pressure-contact with the periphery of a hub 32 of the disc-like member 31 and has the other or outer leg fastened to a projection 37a' which is provided on the arm 37a. The spring 33a is designed to resiliently actuate the arm 37a to be swung about the pin 38a outwardly or in counterclockwise direction to a limit which is provided by a stop pin 35a rigidly mounted on the disc-like member 31. It will be appreciated that the spring 33a is of a character which would allow the arm 37a and the friction member 34a thereon to be generally radially inwardly shifted relative to the surface of the disc-like member 31 as the coefficient of friction between the cooperating driving and driven members is varied during the operation of the clutch of the invention. Thus, the friction member 34a is caused to move along a circle of decreased radius so that the torque transmitted is not varied with the variation in the coefficient of friction but is maintained substantially constant irrespective of the variation in the coefficient of friction.

Figure 7:
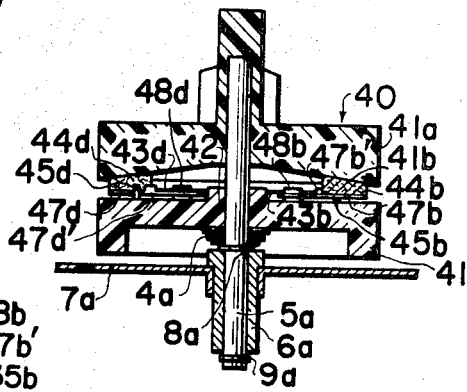
FIG. 7 is an axial sectional side view of a slip-clutch according to another aspect of the present invention with a torque transmitting pulley of the clutch being shown as taken along line VII — VII in FIG. 8.
Figure 8:
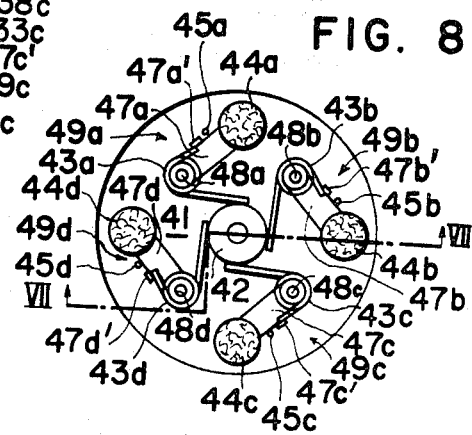
FIG. 8 is a plan view of the pulley shown in FIG. 7.

FIGS. 7 and 8 illustrate a slip-clutch 40 according to another aspect of the present invention. The slip-clutch 40 comprises a torque transmitting driving pulley 41 and a driven wheel or reel supporting and driving wheel 41a which is substantially identical in construction with the wheel 1 shown in FIG. 1 excepting a feature that the wheel 41a has a bottom surface 41b which is radially inwardly and upwardly inclined to provide a generally conical surface. The frictionally driving pulley 41 is substantially of the same construction as the torque transmitting pulley 30 of the preceding embodiment with the exception that the friction members have their upper surfaces inclined, as shown in FIG. 7, so as to be in frictionally sliding intimate contact with the conical bottom surface 41b of the driven wheel 41a. The parts of the pulley 41 are indicated by reference numerals the same as those added to the corresponding parts of the preceding embodiment plus ten (10). For example, one of the friction members of the instant embodiment is indicated by 44a which is the sum of 34a added to the corresponding member of the preceding embodiment and added ten (10).

Figure 2:
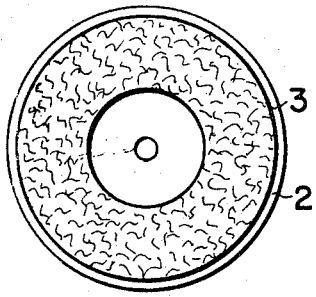
FIG. 2 illustrates in plan view the driving member and the friction material of the clutch shown in FIG. 1.

The slip-clutch 40 is operatively supported on a stationary machine part by means of a spring 4a, a shaft 5a, a bearing 6a, a frame portion 7a and stop rings 8a and 9a which are arranged in similar manner to that in which the corresponding members of the prior art device shown in FIG. 1 are arranged.

With the arrangement described and illustrated in the above, when the coefficient of friction between the set of friction members 44a to 44d and the conical bottom surface 41b of the driven wheel 41a is varied, the friction members are caused to be radially displaced so that the members become to have varied distance from the axis of the driving pulley 41. For this reason, the axial distance between the stop ring 8a for the spring 4a and the frictionally sliding surface of each friction member is varied, with a result that the pressure force of the spring 4a acting on each friction member is varied to automatically regulate the friction between the set of friction members and the conical surface 41b of the driven wheel 41a for thereby transmitting a regulated or constant torque from the friction members to the driven wheel.

More specifically, the torque transmitted by the clutch of the instant embodiment is also represented by the equation (1) referred to previously. Now, it is assumed that the coefficient of friction $\mu$ is increased. The friction members 44a to 44d are then subjected to an increase in the friction force between the set of the friction members and the conical bottom surface 41b, which friction force in turn becomes to have an increased force component which is generally radially inwardly directed as discussed previously with reference to FIG. 4. The increment of the inwardly directed force component causes the friction members to be displaced radially inwardly against the springs 43a to 43d so that the friction members become to have decreased redius of the circle along which the friction members are moved or swivelled. The radially inward displacement of the friction members results in decrease in the pressure force of the spring 4a acting perpendicularly upon the friction members. Thus, it will be appreciated that the decrements in the pressure force $P$ and in the radius $R$ serve to compensate for the increment in the coefficient of friction $\mu$ so that a torque of the same magnitude as initial one is obtainable from the slip-clutch of the instant embodiment of the present invention.

In practice, the springs 13a to 13d, 23a to 23d, 33a to 33d and 43a to 43d are designed to have strengths and characteristics which are determined from the considerations on the required range of compensation of the variation in the coefficient of friction, on the characteristics or nature of the variation in the coefficient of friction, on the locations at which the friction members are supported, and on the configuration of the friction member guide grooves in which the coil springs are to be mounted so that the springs are able to provide compensation characteristics which are satisfactory to the intended torque-transmission characteristic.

The torque transmitting pulleys 10, 20, 30 and 41 described and illustrated in the above are designed to be resiliently urged against the cooperating driven members or reel supporting and driving wheels by means of compression springs similar to the spring 4 in the conventional clutch shown in FIG. 1. It is, however, to be understood that such compression springs may be eliminated by employing friction member supporting springs which can provide resiliency also in the axial direction of the pulleys.

It will be appreciated from the foregoing description and illustration that the present invention provides a slip-clutch which can transmit a constant or regulated magnitude of torque throughout the operative life of the clutch.

While the present invention has been described in conjunction with a tape recording and reproducing apparatus, it is to be understood that the clutch of the present invention is also applicable to other apparatuses which require constant torque transmission.

What is claimed is:

1. A slip clutch comprising a rotatable driving member, a rotatable driven member disposed in opposite co-axial relationship to said driving member, friction means between said driving and driven members, and means on said driving member for supporting said friction means in torque transmitting frictional sliding contact with said driven member in a manner whereby said friction means is radially displaceable relative to the rotational axis of said driven member, a resiliently yieldable means urging said friction means radially relative to the aforementioned axis, whereby when the coefficient of friction between said friction means and said driven member is varied, said friction means are moved radially relative to the driven member rotational axis so as to automatically compensate for the aforementioned variation in the coefficient of friction.

2. A slip clutch as claimed in claim 1, in which said driving and driven members are disc-like members, said friction means comprising a plurality of friction members of a fibrous material, said resiliently yieldable means including a plurality of spring members each resiliently urging one of said friction members in a generally radial sense relative to the rotational axis of said driving and driven members.

3. A slip clutch as claimed in claim 2, in which said driving member has a central hub on the surface thereof adjacent said driven member, said yieldable means comprising arcuate blade springs each having one end secured to said central hub and extending radially outwardly therefrom, said friction members being mounted at the other ends of said springs.

4. A slip clutch as claimed in claim 2, in which said driving member is formed with grooves in the surface thereof adjacent said driven member, said yieldable means comprising compression springs each disposed in one of said grooves and having one end secured to the driving member at one end of the associated groove and the other end being connected with one of said friction members in such a manner that each friction member is acted upon by a said spring to move along an associated groove.

5. A slip clutch as claimed in claim 2, in which said driving member has a central hub on the surface thereof adjacent said driven member, a plurality of circumferentially spaced pin members on said driving member surface, each of said pin members being positioned radially between said hub and the outer peripheral edge of said driving member, and an arm member mounted at one end on each said pin member for pivotal movement thereabout, each of said friction members being mounted on one of said arm members at the other end thereof, each of said spring members having a generally V-shaped configuration and being mounted on one of said pin members for rotation thereabout, each spring member having its ends engaged with said central hub and the associated arm member, respectively.

6. A slip clutch as claimed in claim 1, in which said driving and driven members are disc-like members, respectively, said driven disc-like member having its friction surface radially inclined to provide a conical surface with which said friction means are in torque transmitting sliding contact, a variation in the radial position of said friction means correspondingly varying the pressure force on the friction surfaces of said driven disc-like member and said friction means to thereby compensate for the variation in the coefficient of friction between said friction surfaces.

7. A slip clutch as claimed in claim 6, in which said friction means comprise a plurality of friction members of a fibrous material, said resiliently yieldable means comprising a plurality of spring members, said driving disc-like member having a central hub on the surface thereof adjacent said driven disc-like member, a plurality of circumferentially spaced pin members on said surface of said driving disc-like member, each of said pin members being positioned between said hub and the outer peripheral edge of said driving disc-like member, and an arm member mounted at one end on each of said pin members for pivotal movement thereabout, each of said friction members being mounted on one of said arm members at the other end thereof, each of said spring members having a generally V-shaped configuration and being mounted on one of said pin members for rotation thereabout, each spring member having its ends engaged with said central hub and the associated arm member, respectively.

* * * * *